United States Patent
Meszaros

(10) Patent No.: US 8,501,129 B2
(45) Date of Patent: Aug. 6, 2013

(54) METHOD FOR REDUCTION OF THE $CO_2$ CONTENT OF FLUE AND ATMOSPHERIC GASES, AND EQUIPMENTS FOR APPLICATION OF THE METHOD

(76) Inventor: Ferenc Meszaros, Piliscsev (HU)

(*) Notice: Subject to any disclaimer, the term of this patent is extended or adjusted under 35 U.S.C. 154(b) by 0 days.

(21) Appl. No.: 13/521,299

(22) PCT Filed: Jan. 14, 2010

(86) PCT No.: PCT/IB2010/000060
§ 371 (c)(1),
(2), (4) Date: Jul. 10, 2012

(87) PCT Pub. No.: WO2011/086402
PCT Pub. Date: Jul. 21, 2011

(65) Prior Publication Data
US 2012/0294787 A1 Nov. 22, 2012

(51) Int. Cl.
*B01D 53/62* (2006.01)
*B01D 53/78* (2006.01)
*C25B 1/00* (2006.01)

(52) U.S. Cl.
USPC ........... 423/220; 422/162; 422/129; 204/194; 205/340; 205/345; 205/480; 205/482; 205/508; 205/555; 588/303

(58) Field of Classification Search
USPC ... 423/220; 422/162, 129; 204/194; 205/340, 205/345, 480, 482, 508, 555; 588/303
See application file for complete search history.

(56) References Cited

U.S. PATENT DOCUMENTS

| | | | | |
|---|---|---|---|---|
| 4,451,342 A | * | 5/1984 | Lichtin et al. | 204/157.15 |
| 4,545,872 A | * | 10/1985 | Sammells et al. | 205/340 |
| 8,227,127 B2 | * | 7/2012 | Little et al. | 429/443 |
| 2006/0185985 A1 | | 8/2006 | Jones | |
| 2008/0286643 A1 | | 11/2008 | Iwasaki | |
| 2012/0121491 A1 | * | 5/2012 | Rau | 423/234 |
| 2012/0228146 A1 | * | 9/2012 | Deguchi et al. | 205/340 |

FOREIGN PATENT DOCUMENTS

| | | |
|---|---|---|
| EP | 1 768 190 A1 | 3/2007 |
| JP | 8-290052 A | 11/1996 |
| RU | 2 357 788 C2 | 6/2009 |

OTHER PUBLICATIONS

International Search Report of PCT/IB2010/000060 (Sep. 23, 2010).
V.M. Bakhira et al. "Elektrokhimicheskaya Aktivatsiya: Istoria, Sostoyanie, Perspektivy", Moskva, Akademia Mediko-Tekhnicheskikh Nauk Rossyskoi Federatsii, (1999) pp. 10-11.

* cited by examiner

*Primary Examiner* — Timothy Vanoy
(74) *Attorney, Agent, or Firm* — Millen, White, Zelano & Branigan, P.C.

(57) ABSTRACT

The subject of the invention is a method for reduction of the $CO_2$ content of flue and atmospheric gases and equipment for application of the method. The characteristic of the solution according to the invention is, that "hydroxide" ionized water containing ($OH^-$) ions of alkaline characteristics is used as reaction medium for binding carbon dioxide ($CO_2$) gas, and carbon dioxide ($CO_2$) gas gets into reaction with alkaline ionized water, and during the reaction from the carbon dioxide ($CO_2$) gas and water, carbonate ion ($CO_3^{2-}$) and hydrogencarbonate/bicarbonate ($2HCO_3^-$) are formed, and they leave for the outside atmosphere and/or outside water with the bound $CO_2$ content in stable gas or liquid form.

20 Claims, 9 Drawing Sheets

METHOD FOR REDUCTION OF THE CO₂ CONTENT OF FLUE AND ATMOSPHERIC GASES, AND EQUIPMENTS FOR APPLICATION OF THE METHOD

The subject of the invention is a method for reduction of the $CO_2$ content of flue and atmospheric gases and equipment for application of the method.

The feature of the method is, that using ionizing cells in the socalled reactor vessel, the water molecules are polarized resulting from direct voltage and we realize carbon dioxide reduction with the help of hydroxide ($OH^-$) ions resulting from the autoprotolysis of water due to ionization.

The quantity of carbon dioxide emission has been causing ever-greater problems all over the world and it has been increased from year to year with the extension of industrial activities. The direct and indirect effects of carbon dioxide emission of the industry on the environment are well known. Carbon dioxide, as a gas with greenhouse effect influences the conditions of climate. Among other factors global warming is due to this.

In the state of the art methods of decreasing gas, respectively neutralization of flue gases are the following:
Filtering (e.g. active carbon)
Metal catalyst
Gas scrubber (e.g. lime milk—CaOH pulverization into gas)
Gas absorption (into a reducing liquid, e.g. water containing sodium hydroxide) etc.

There are a lot of technologies to clean flue gases (to reduce emission) known for the skilled persons, used widespread in the industry for decades. E.g. elimination of sulphur from the flue gases of power stations. Sulphur dioxide ($SO_2$) and sulfurous acid ($H_2SO_3$) are harmful for the environment and toxic for living organisms.

The other gas I would like to highlight as an example, because it is the main topic of discussions in the world, is carbon dioxide ($CO_2$).

In the state of the art there is no economical technology that can be used on industry level for binding and/or neutralizing "$CO_2$"! This gas is held responsible for the climate catastrophes, respectively for global warming. All over the world carbon dioxide emission of industry, transport (air-land-water), power stations, domestic, etc. can be measured in tens of billions of tons. Today a lot of scientists and climate experts agree on that, that carbon dioxide emission must be reduced and radical measures should be applied to treat "$CO_2$" problems, because the future of mankind is at stake.

I highlighted these two gases (or flue gases) "$SO_2$", "$CO_2$" particularly carbon dioxide, as this is mankind's number one problem to be solved!

Possibilities: theoretically and/or on laboratory level, possibly in small size measure (e.g. active carbon filters) it is possible to bind, stabilize and change carbon dioxide gases into a different, non-agressive compound.

In industrial size, globally, in each country of the world it is not possible to neutralize "$CO_2$" in significant quantities!

There are trials, tests, experiments of bigger volume in several countries to bury "$CO_2$" underground, into rock layers, into hollows under the sea in a distance of 1-1.5 km to store. Experts in the subject are optimistic about the project, but for the time being the method is not safe enough and extremely expensive. There is no guarantee either to keep the gas deep down. At present there are no other known projects of industrial size under way.

In the state of the art there are different "gas-washing" "gas-absorbing" technologies, as well as such solutions, that use liquids for neutralizing gases. These liquids are almost always water solutions, suspensions.

Here the water always contains a kind of chemical, additive, socalled reaction partner: as a reaction agent and partner is needed to be able to create a new compound, to transform the gas into an other form. E.g. potassium hydroxide (KOH), —sodium hydroxide (NaOH), —calcium hydroxide ($Ca(OH)_2$), magnesium-hydroxide ($Mg(OH)_2$). The water solution of these materials ensures an alkaline agent, and if gas (e.g. CO)) reacts with it, then the gas is transformed into an ion, respectively a salt.

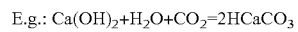

E.g.: $Ca(OH)_2 + H_2O + CO_2 = 2HCaCO_3$

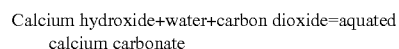

Calcium hydroxide+water+carbon dioxide=aquated calcium carbonate

If "$CO_2$" is absorbed in clean (neutral) water, then water containing carbonic acid ($H_2CO_3$) is produced, so we still possess an aggressive gas, which is instable, and diffuses out of the water. In order to bind and stabilize carbon dioxide, the water must be alkaline, e.g. with an alkali metal. This case the agressive "$CO_2$" or carbonic acid is transformed into a "carbonate ion". If calcium hydroxide is added to the water, then calcium carbonate is produced, which is a stable formation in the long term as well.

The problem with this method is, that a large quantity of additive is needed. More precisely the ratio is: one tone of sodium hydroxide is needed for one tone of $CO_2$.

On industrial scale it looks like this: e.g. if a smaller power station emits abt. one million tons of $CO_2$, then one million tons of NaOH is needed to neutralize it. Obviously the new material (salt-like) should be looked after as well.

Aim

When realizing the solution according to the invention, my aim was to elaborate a really efficient and environmentally friendly method that can be applied in industrial scales as well to bind carbon dioxide being produced in ever increasing quantity. My aim was as well to work out such a method and equipments suitable for extracting arisen carbon dioxide from the atmosphere beside binding it, so reducing the quantity of carbon dioxide gas burdening the atmosphere.

Realization

When working out the solution according to the invention I realized, that in case ionized "hydroxide" water, containing alkaline ions ($OH^-$) of alkaline characteristics is used as the reaction agent, then by this carbon dioxide ($CO_2$) gas can be bound, stabilized, respectively reduced to a different compound. ($CO_2$) gas reacts with the alkaline ionized water causing the change of the state of matter and chemical transformation of ($CO_2$). The gas changes to ion (which corresponds with a plasma state) and aquated ion, which is a form dissolved in water. E.g. carbon dioxide $CO_2$ gas transforms to carbonate ion ($CO_3^{2-}$) and/or hydrogencarbonate/bicarbonate ($2HCO_3^-$).

The invention is a method for reduction of the $CO_2$ content of flue and atmospheric gases, which is characterized by that, during the method "hydroxide" ionized water containing ($OH^-$) ions of alkaline characteristics is used as reaction medium for binding carbon dioxide ($CO_2$) gas, and carbon dioxide ($CO_2$) gas gets into reaction with alkaline ionized water, and during the reaction from the carbon dioxide ($CO_2$) gas and water, carbonate ion ($CO_3^{2-}$) and hydrogencarbonate/bicarbonate ($2HCO_3^-$) are formed, and they leave for the outside atmosphere and/or outside water with the bound $CO_2$ content in stable gas or liquid form.

In one preferred application of the method according to the invention, hydroxide (OH⁻) ion is produced in an ionization cell and in the ionization cell direct voltage is used for the production of (OH⁻).

In another preferred application of the method according to the invention, the material of the electrodes (6) used in the ionization cell is titanium, or the surface of the said electrodes is titanium, or has titanium dioxide coating, that makes possible ionization with photocatalysis under the effect of light, during which the surface of the electrodes (6) is induced with UV radiator (7), so by adding an electron to neutral $O_2$ gas, $O_2^-$ ion (peroxide ion) is produced, meanwhile the voltage on the electrodes (6) polarizes and ionizes the water, and $O_2^-$ ion, (peroxide ion) gets into reaction with $H_2O$ molecule and produces OH⁻ (hydroxide) ion and $HO_2^-$ (perhydroxil) ion, then $CO_2$ to be bound gets into reaction with the negatively ionized water (OH⁻ (hydroxide) and $HO_2^-$ (perhydroxil)) and produces $HCO_3^-$ and/or $2HCO_3^-$ ion.

In a further preferred application of the method according to the invention, a cylinder or sphere preferably of proper raw material, or of proper surface-treatment, titanium or titanium dioxide coated cylinder or sphere is used, where the coating is the electron transmitter and the effect of photocatalysis is made use of, during which the $TiO_2$ surface is induced by electromagnetic radiation, in given case by outside natural or artificial light, when an electron-hole pair is created, having the characteristics of easily passing its charge, this case the partner taking up the charge is $O_2$ gas—furthermore an ion $O_2^-$ charged with an electron is arisen, and this way oxidation with photocatalysis (ionization) takes place, in a further step of the method as the continuation of the reaction in the water medium the $O_2$ molecule with electric charge passes its charge to a hydrogen, proton (H⁺)—an electron defect hydrogen of the water molecule—, and polarized $H_2O$ is divided into two separate ions of charge, $H_2O + O_2^- = HO_2^- + (OH^-)$, with the rotation of the sphere or cylinder continuously a water film is produced on its surface, and the reaction takes place in the water film, so the cylinder continuously binds $CO_2$ with its rotation, which is afterwards dissolved into the water.

In a further preferred application of the method according to the invention, it is used in closed and/or open system.

In a further preferred application of the method according to the invention, in case of combined, closed system application, photo-oxidation and direct current ionization are used together in such a way, that binding of carbon dioxide takes place in a closed cell, using pulverization, and ion rich water (OH⁻+$H_2O$) is circulated in the closed reduction cell with the help of a circulating pump, which pump circulates only the negative charged hydroxide water through the ionization equipment, the electron defect water ($H_3O^+$) leaving at the other side of the ionizator is fed back to the ionizator in such a way, that leading through a so-called photo-oxidation regenerating unit where the $O_2$ in the air blow neutralizes the acid water, even makes it slightly alkaline, and the result of the method is a circle process resulting in continuously alkaline, hydroxide (OH⁻) ion charged water and no acid water ($H_3O^+$), that is no waste is produced.

In a further preferred application of the method according to the invention, the method is used in case of industrial units, power stations, furnaces etc. of great $CO_2$ emission in a located, installed way.

In a further preferred application of the method according to the invention, it is used in given case with land vehicles, power machines in a mobile, not located way.

In a further preferred application of the method according to the invention, it is used in a mobile, not located way in case of water vehicles, ships.

In a further preferred application of the method according to the invention, it is used in a mobile, not located way in given case in aircraft, airplanes, or helicopters.

The invention is further an equipment for reducing $CO_2$ content of flue and atmospheric gases, primarily for realization of method according to any of claims 1-10, which is characterized by that, in case of a closed system reaction vessel (1) there is a flue gas inlet (2) at the lower part of the reaction vessel (1), and the flue gas gets to the lower part of the reaction vessel (1) to the gas pulverizer (15) through a one-way valve (3), water is fed through the water feeder (8) also to the lower part of the reaction vessel (1), from where the flue gas goes upward and gets to the ionization space (16) through the perforations (4) of the pulverizer surface (4) of the gas pulverizer (15), in the said ionization space (16) there is the reaction medium (11), which is polarized, ionized water produced by the ionization voltage (U) created by the direct current supply unit (5), the level of the said water is up to the overflow (12) on the sidewall of the reaction vessel (1), and in the ionization space (16) there are the electrodes (6) made of titanium, or coated with titanium dioxide, having ion forming surface (14) collecting the proper ions in their surroundings and ionization with photocatalysis (17) takes place on their surface, and in given case a horizontal UV radiator (7) is placed in the reaction medium (11) in the middle of the ionization space (16), after the reactions passed off in the reaction medium (11), the gas components leave the reaction vessel (1) from the gas space (13) situated above the reaction medium (11) through the pressure regulating valve (9) and gas outlet (10).

In one preferred embodiment of the equipment according to the invention, in case of a possible definite interior realization of the closed system reaction vessel (1) the electrodes (6) are situated in two rows, in standing position, parallel with each other and between them, in horizontal position there are two oblong UV radiators (7), furthermore in the bottom of the reaction vessel (1) there is a gas pulverizer (15) unit, which is provided at the upper part with a pulverizer surface with fine perforations (4).

In another preferred embodiment of the equipment according to the invention, the closed system reaction vessel is used on ships, the outer mass of water (24) in given case a lake, river, or sea, on the surface of which the ship (23) floats and the gas processing cell (18) having a closed system reaction vessel (1) arrangement is situated on board the ship (23), and the reaction vessel (1) has a gas outlet (10) and an overflow (12), and where the seawater gets through the water soaking in (22) under the effect of the pump (21) to the vertical pipe of the gas processing cell (18) protruding into the chimney (25) of the ship (23), the outside air also gets to the vertical pipe of the gas processing cell (18) protruding into the chimney (25) of the ship (23) through the air inlet (19), and the gas flue leaves through the outgoing flue opening (20) through the gas processing cell (18) and gas outlet (10).

The invention is further an equipment for the reduction of $CO_2$ content of flue and atmospheric gases, primarily for realizing the method according to any of claims 1-10, which is characterized by that, in case of realizing a self-supporting, open system, a rotating, carbon dioxide harrow (33) of cylinder or spherical shape is formed on the upper part of the outer mass of water (24), the raw material of the said carbon dioxide harrow (33) is titanium, or such an object, the outer surface of which is provided with a titanium dioxide coating, and the electron transmitter and photocatalysis effect of the titanium dioxide is made use of in such a way, that resulting from the rotation of the carbon dioxide harrow (33) on the outer, titanium dioxide surface (26) of the carbon dioxide harrow (33) continuously a water film (27) is created, and the active surface of the carbon dioxide harrow (33) can be considerably increased in given case by forming a porous surface.

In one preferred embodiment of the equipment according to the invention, in case of a possible located application of the self-supporting open system, rotating carbon dioxide harrows (33) connected with connecting system (36) to each other are placed on the upper part of the outer mass of water (24) fixed to the island fastening (37), furthermore current generator (34) and UV reflectors (35) are used, and the carbon dioxide harrows (33) are in constant movement resulting from the movement and fluctuation of water, a water film (27) creating on their outer titanium dioxide surface (26), during daytime daylight light energy (31) and at night night-light energy (32) induce the water film (27) creating on their outer titanium dioxide surface (26), resulting in photocatalyst reaction on the outer surface of carbon dioxide harrows (33), and the $CO_2$ content of the atmosphere is continuously dissolved into the water, realizing the method according to the invention, by carbon dioxide harrows (33) the daytime function is ensured by the sunshine, whereas the night time function is ensured in given case by a current generator (34) working with wind energy, as well as UV reflectors (35) lighting the outer surface of the carbon dioxide harrows (33) with light of 190-310 nm UV range wavelength.

In another preferred embodiment of the equipment according to the invention, in case of a possible mobile application of the self-supporting, open system the carbon dioxide harrows (33)—connected by the connecting system (36) to each other—are fixed by this connecting system (36) to the ship (23) floating on the surface of the outer mass of water (24), and they are towed on the water surface by the ship (23), resulting in the rotation of the carbon dioxide harrows (33) and the creation of a continuous water film on their surface, the surface of the carbon dioxide harrows (33) is activated by the daylight light energy (31), and during the towing dissolving of $CO_2$ from the atmosphere into the water takes place continuously.

In a further preferred embodiment of the equipment according to the invention, in case of a definite realization, the diameter of the spheres carrying the catalyst surface is 1-2 m, their geometrical surface is a few square meters, said surface is preferably of porous formation, so in practice, due to the porous formation of the surface, the spherical surface corresponds with several hundred or thousand square meters, so in given case the active surface of a few dozens of rotating spheres attracting $CO_2$ molecules is several square kilometers.

In a further preferred embodiment of the equipment according to the invention, in case of application of the self-supporting and closed system in a combined, fix, installed way, in given case it is realized as a reduction island (47), which in given case a sea natural gas extracting drilling rig (41) with a natural gas extraction pipe (42), where the gas separator (43) is situated above the water surface of the sea natural gas extracting drilling rig (41), on which UV reflectors (35) are fixed, and the delivery of clean natural gas (44) and channeling of separated $CO_2$ (45) takes place below sea surface, the ion forming cell island (40) is fixed to one of the sides of the sea natural gas extracting drilling rig (41) and below this in the surroundings of the carbon dioxide harrows (33) connected with a connecting system (36) to each other takes place the pulverization of $CO_2$ (46), the carbon dioxide harrows (33) connected with a connecting system (36) to each other join the other side of the sea natural gas extracting drilling rig (41) furthermore, and they are activated by daylight light energy (31) and the pulverization of $CO_2$ (46) takes place in their surroundings as well.

In a further preferred embodiment of the equipment according to the invention, in case of a possible realization of the self-supporting, mobile system a ship (23) hulk, surface-treated with $TiO_2$ is used, the pump (21) and the water spray (48) are situated on board the ship (23), and the upper, or complete surface of the ship (23) is coated with $TiO_2$, and water eg. pumped out of the sea is run or sprayed on the surface, creating a thin water layer, in which resulting from the sunshine continuous ion creation ($OH^-$) by photocatalization takes place, and as the continuation of the reaction atmospheric $CO_2$ diffuses into the water layer enriched by hydroxide ions, which is reduced by the process already described, and as a next step it dissolves into the sea in its natural form ($HCO_3^-$).

In a further preferred embodiment of the equipment according to the invention, in case of combined closed system application, the two methods, photo-oxidation and direct current ionization are applied together in such a way, that the reaction vessel (1) is provided with the flue gas inlet (2) through the one-way valve (3), the pulverizer surface (4), ion valves (49), gas outlet (10) through the pressure regulating valve (9) as well as overflow (12), and the ionization regenerating system (50) whose elements are the high voltage supply unit (51), the circulating pump (52), the ionizator (53), the air pump (54), the acid water regenerator (55), the $TiO_2$ catalyst (56), the photo catalyzation UV radiator (57), the air vent (58), the circulation (59), the platinum membrane (60), the ionized water feedback (61), as well as the ionized water inlet (62).

The Most General Realization of the Method According to the Invention

In case of the most general realization of the method according to the invention, the method is identical with the examples mentioned in the state of the art only, that it uses "water" as reaction agent.

The method is based on the autoprotolysis of water ($H_2O$). Resulting from the effect of the current, water dissociates to its ions. ($H_3O$ hydroxonium and $OH^-$ hydroxide ions). This is the ionization of water, that is ionized water is produced resulting from appropriate voltage. The water molecule is structured into its ions: acid hydrogen and alkaline hydroxide ions.

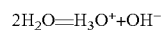

$$2H_2O = H_3O^+ + OH^-$$

Two water molecules produce=one acid hydroxonium and one alkaline hydroxide ion. The ionization process is different from the known water electrolysis, that lower voltage is used, so water molecules "only" get structured, while electrolysis results in gas production. The water decomposes to hydrogen and oxygen gases.

Consequently the essence of the method according to the invention is ionized water. More precisely "hydroxide" water, water with alkaline characteristics. Ion concentration can be regulated by the extent of the ionization of the water, respectively with the separation of the ionized molecules. So the water containing acid, respectively alkaline ions is separated. In our case water containing mostly alkaline ions ($OH^-$) is used. This water solution of high hydroxide ($OH^-$) ion concentration is used for the reduction of the gas. The pH (reaction) of the ionized water is increased between value 7-11. With different methods ($OH^-$) ion concentration can be increased even above pH value 13, which corresponds with a strongly alkaline solution. The method of this will be described in detail during making known of certain applications of the solution according to the invention.

In case of the application of the solution according to the invention, gases can be bound, stabilized, respectively reduced into a different compound with the help of the water of alkaline characteristics produced according to the method introduced above. The gas reacts (gets into reaction) with the ionized water of alkaline ions, resulting among others in change of state of the matter and chemical transformation. The gas is transformed into ion (conforming to plasma state) and aquated ion. E.g. carbon dioxide CO? gas is transformed into carbonate ($CO_3^{2-}$) ion and/or hydrogencarbonate/bicarbonate ($2HCO_3^-$).

The characteristics of hydroxide ion ($OH^-$): a natural material, continuously produced in the atmosphere of the earth, especially close to the ozone layer, due to the ionizing effect of sunshine. Science calls it the "detergent" of the atmosphere. At the moment of formation it immediately reacts with free radicals (e.g. nitrogen oxides, hydrocarbon decomposition products) ever present in the atmosphere, and make them harmless. Near the earth surface binding and absorption of $CO_2$ of biggest volume is done by the seas and oceans. The reaction of these waters is slightly alkaline, around 8.1 pH due also to hydroxid ion ($OH^-$) and carbonate ion content. These waters have been absorbing and storing abt. 70% of the $CO_2$ content of the atmosphere for thousands of years.

So the new method models a natural process, tries to imitate something happening in earth environment for millions of years.

In case of a possible preferable definite application of the method according to the invention such hydroxide ion ($OH^-$) is used for the reduction of carbon dioxide gas, which is extracted from the vapor content of the flue gas and/or the exhaust gas—ionized with the help of direct voltage.

Furthermore by mixing with outside air, using its oxygen content for reacting flue gas and/or exhaust gas in the ionization cell. Resulting from this oxidation and reduction take place parallel in the cell in the ionized water solution. The carbon dioxide gas is reduced due to the effect of the hydroxide ion, and $HCO_3^-$ hydrogen-carbonate ion and/or ($2HCO_3^-$).bicarbonate ion is produced. During the reaction with additional $OH^-$ (hydroxide) ion, $CO_3^{2-}$ carbonate ion and $H_2O$ (water) is produced. —In order to maintain the process and/or to ensure production of hydroxide ion in the parallel cell reaction the added oxygen reacts with the $H_3O^+$ (hydroxonium) ion, oxidation takes place, and $OH^-$ (hydroxide) ion and $H_2O$ (water) are produced.

During a possible realization of the method according to the invention the water molecule is polarized with the help of direct voltage, using socalled "ionization" cell. The current intensity used in the cell can not reach the current intensity used for water electrolysis, because then gases ($O_2$, $H_2$) would be produced. In case the current intensity applied in the cell does not reach the intensity necessary for "electrolysis", then the water molecule is "ionized", resulting in the dissociation of the water molecule to its ions. To ($2H_2O=H_3O^+ + OH^-$) hydroxide ($OH^-$) ion and hydroxonium ($H_3O^+$) ion.

The chemical, electrochemical reactions taking place during the method according to the invention:
1) Ionization: $2H_2O \rightarrow H_3O^+ + OH^- =$ WATER DISSOCIATION
2) Reduction 1: $CO_2 + OH^- \rightarrow HCO_3^-$ or $2CO_2 + 2OH^- = 2HCO_3^-$
3) Reduction 2: $HCO_3 + OH^- \rightarrow CO_3^{2-} + H_2O$
4) Oxidation: Ionization: $½O_2 + H_3O^+ \rightarrow OH^- + H_2O$ It can not take place spontaneously, only resulting from energy input, $-O_2$ can be transformed into atomic state, that is into $½O_2$ only by energy input. (See ionization cell reaction).
5) $4H_3O^+ + O_2 = 6H_2O$ Recombination This is natural recombination taking place without energy input, as atom is the most reactive atom, (so much so, that it does not exist in itself, only combined with a partner), and as soon as it meets a reaction partner, it steals an electron immediately, in our case this reaction partner is the $O_2$. By the way this is the second most reactive element on Earth after hydrogen.

This process is the natural and unique recombination of water.

In our case the process of ionization (ion-production) is as follows:

$O_2 + e^- = O_2^-$

Oxygen+1 electron=Peroxyde ion

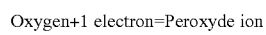
$O_2 + 2e^- = O_2^{2-}$

Oxygen+2 electrons=superoxyde anion

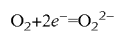
$O_2^- + H_2O^- = OH^- + HO_2^-$

Peroxyde ion+water=Hydroxide ion+Perhydroxyl ion

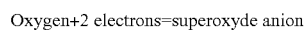
$HO_2^- + H^+ = H_2O_2$

Perhydroxyl+Hydrogen ion=Hydrogenperoxide (oxidized water)

In our case it is not really relevant to say oxidation, as the reaction takes place only in watery medium, so instead of oxides the reaction partners are ions (anion).

Anions are electron donors—cations have electron defect.

BRIEF DESCRIPTION OF THE DRAWINGS

The Solution According to the Invention is Set Forth on Base of the Enclosed Figures The FIG. 1 shows the parts of the closed system reaction vessel and their theoretical arrangement, in side-view.

The FIG. 2 shows a spatial front view of a possible definite interior realization of the closed system reaction vessel 1 shown in the FIG. 1 in side-view.

Figure 3:
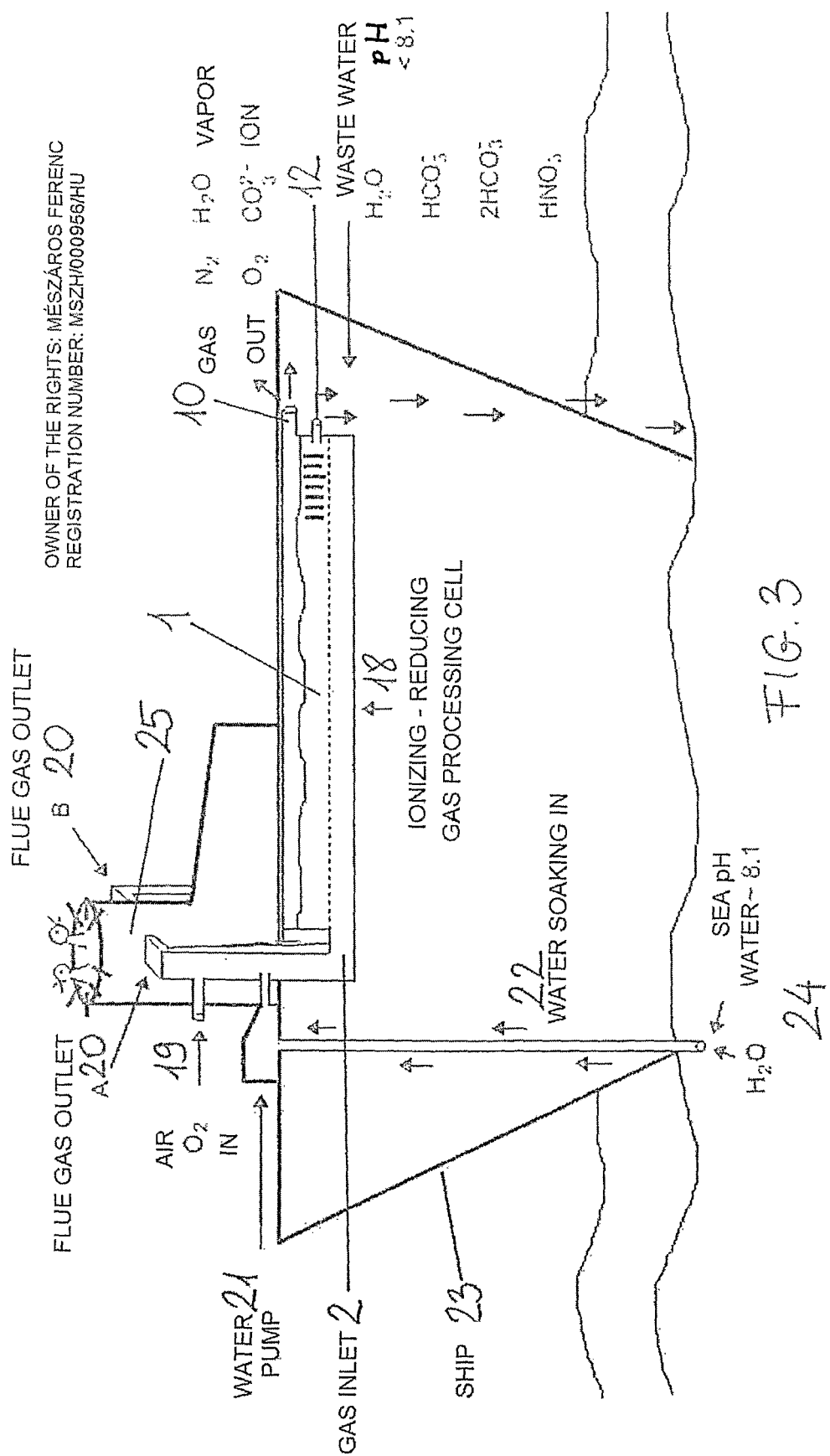

The FIG. 3 shows the application of the closed system reaction vessel on ships.

Figure 4:
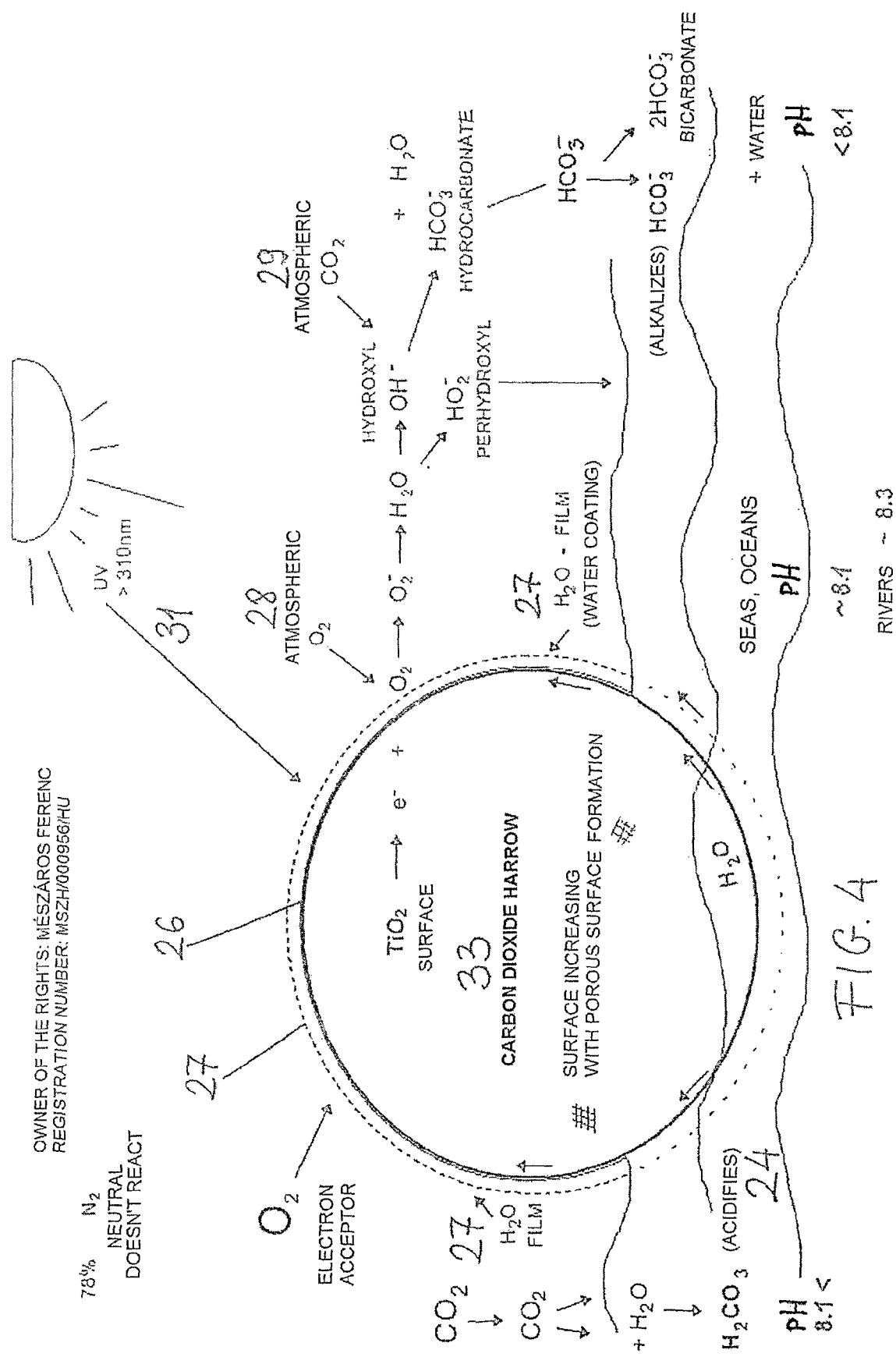

The FIG. 4 shows the theoretical basic arrangement of the self-supporting open system.

Figure 5:
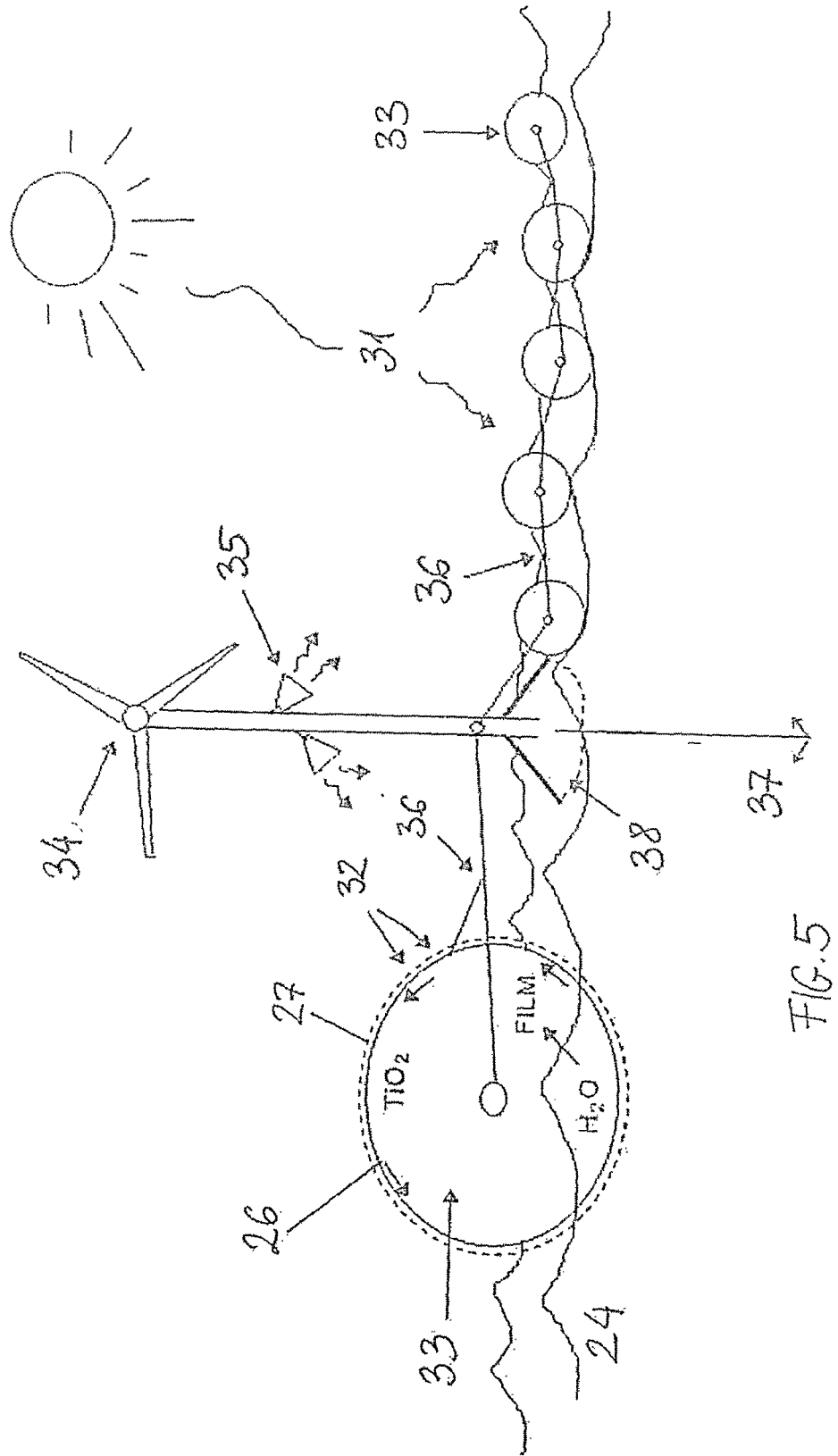

The FIG. 5 shows a possible way of located application of the self-supporting open system shown in the FIG. 4.

Figure 6:
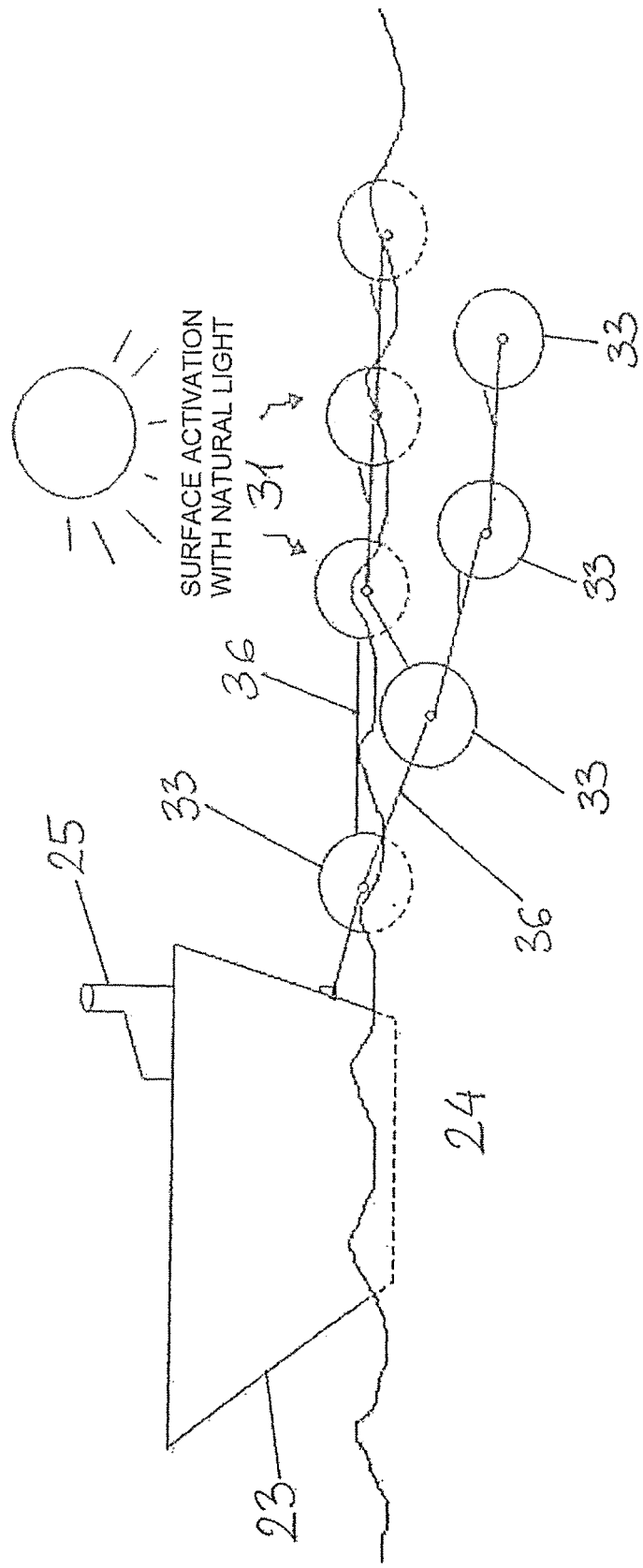

The FIG. 6 shows the theoretical figure of a possible way of mobile application of the self-supporting open system.

Figure 7:
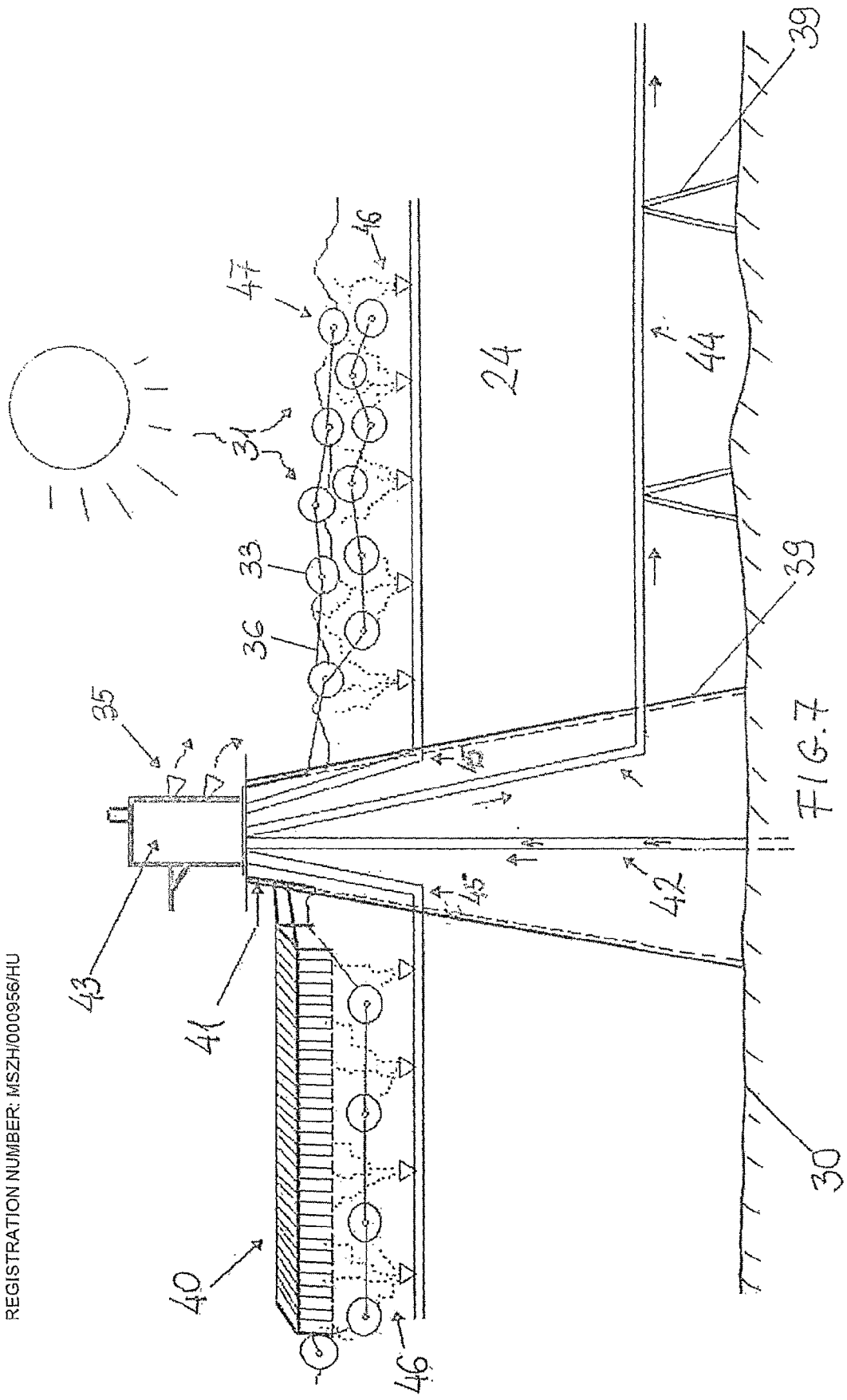

The FIG. 7 shows the theoretical figure of the joint application of the self-supporting and closed system in a fixed, installed way.

Figure 8:
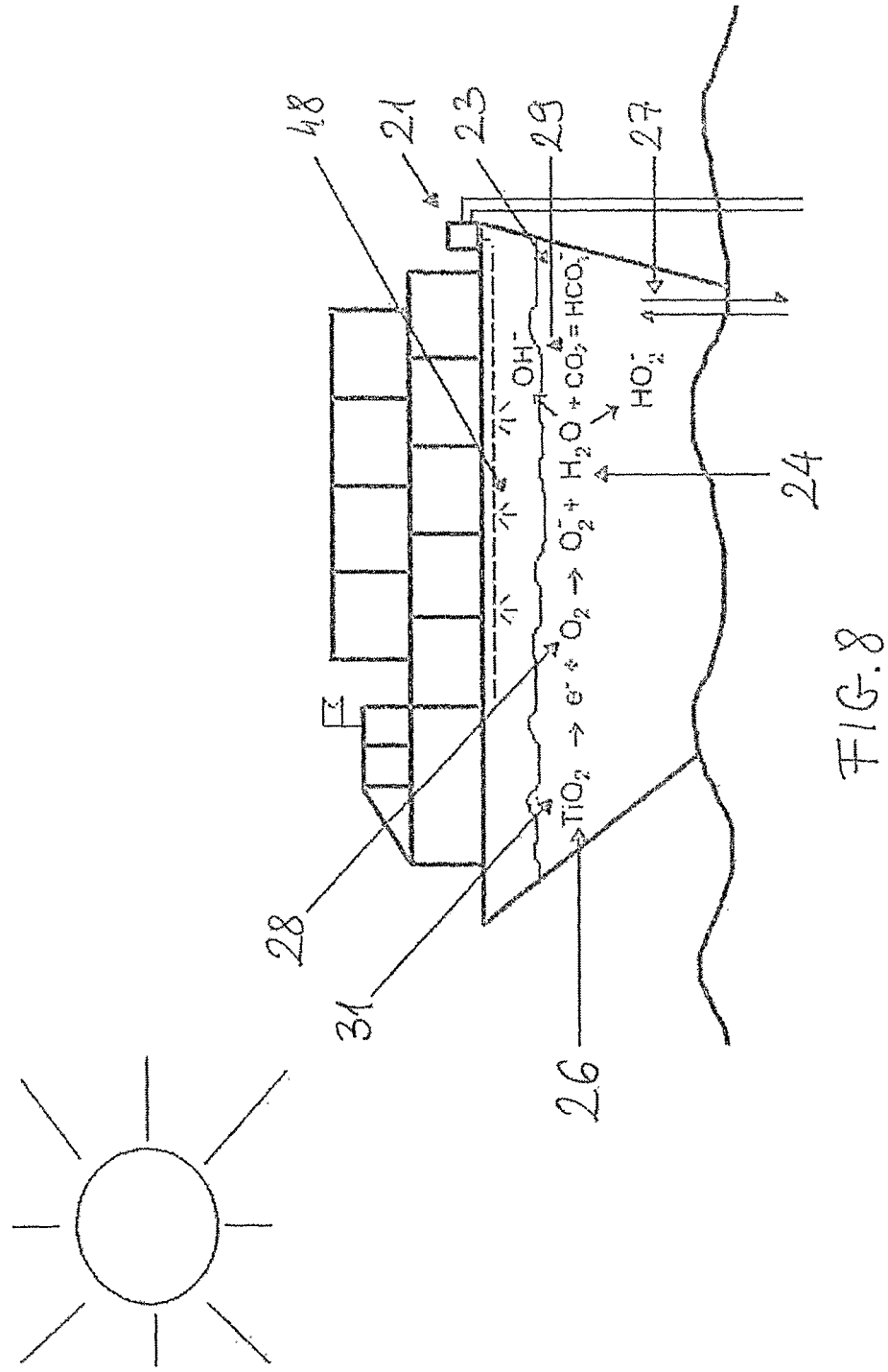

The FIG. 8 shows a possible realization of the self-supporting, mobile system with the application of a ship-hulk surface-treated with $TiO_2$.

Figure 9:
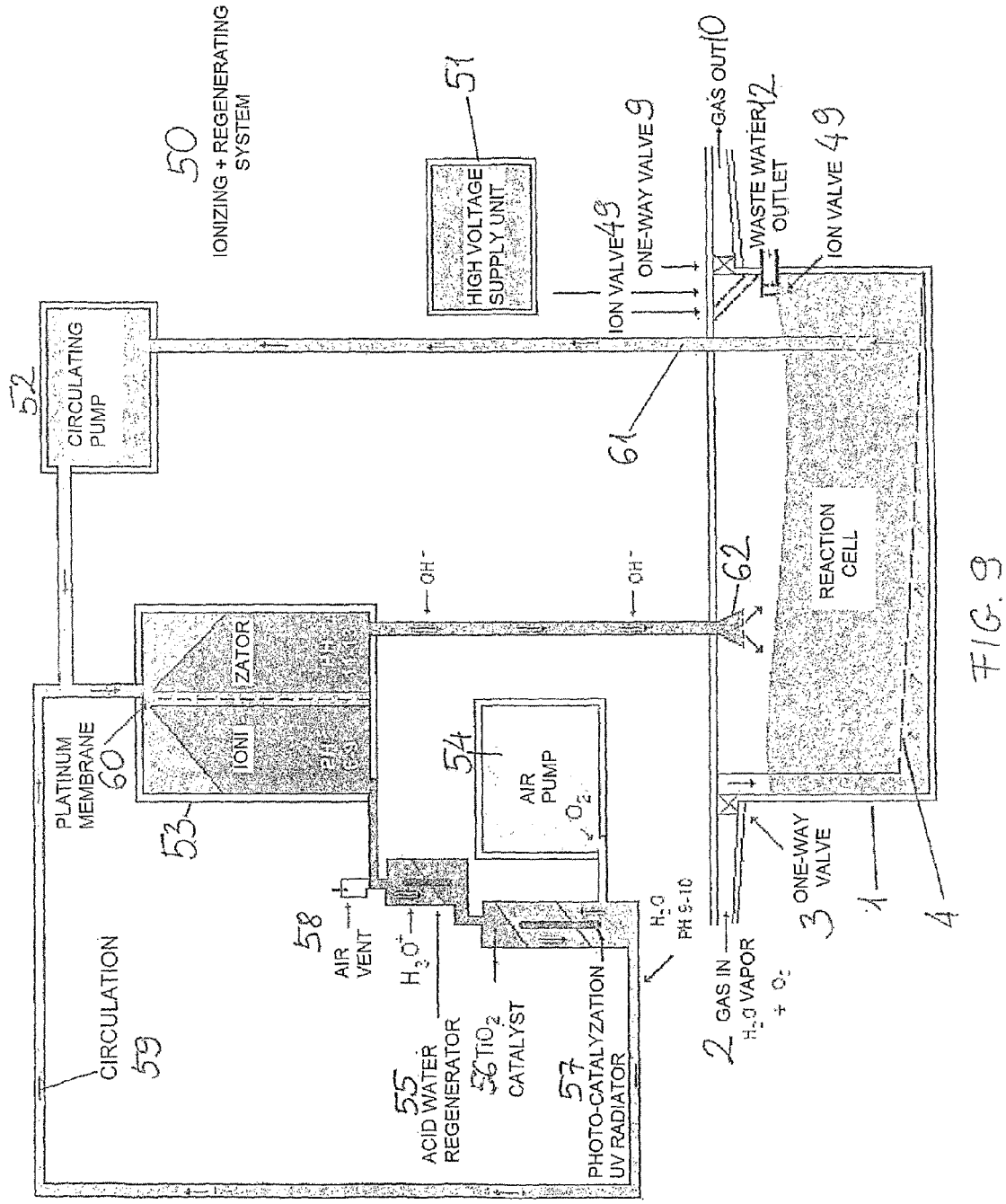

The FIG. 9 shows a theoretical figure of the application of the combined, closed system, that can be installed in a mobile device, in case of joint application of both systems.

Figure 1:
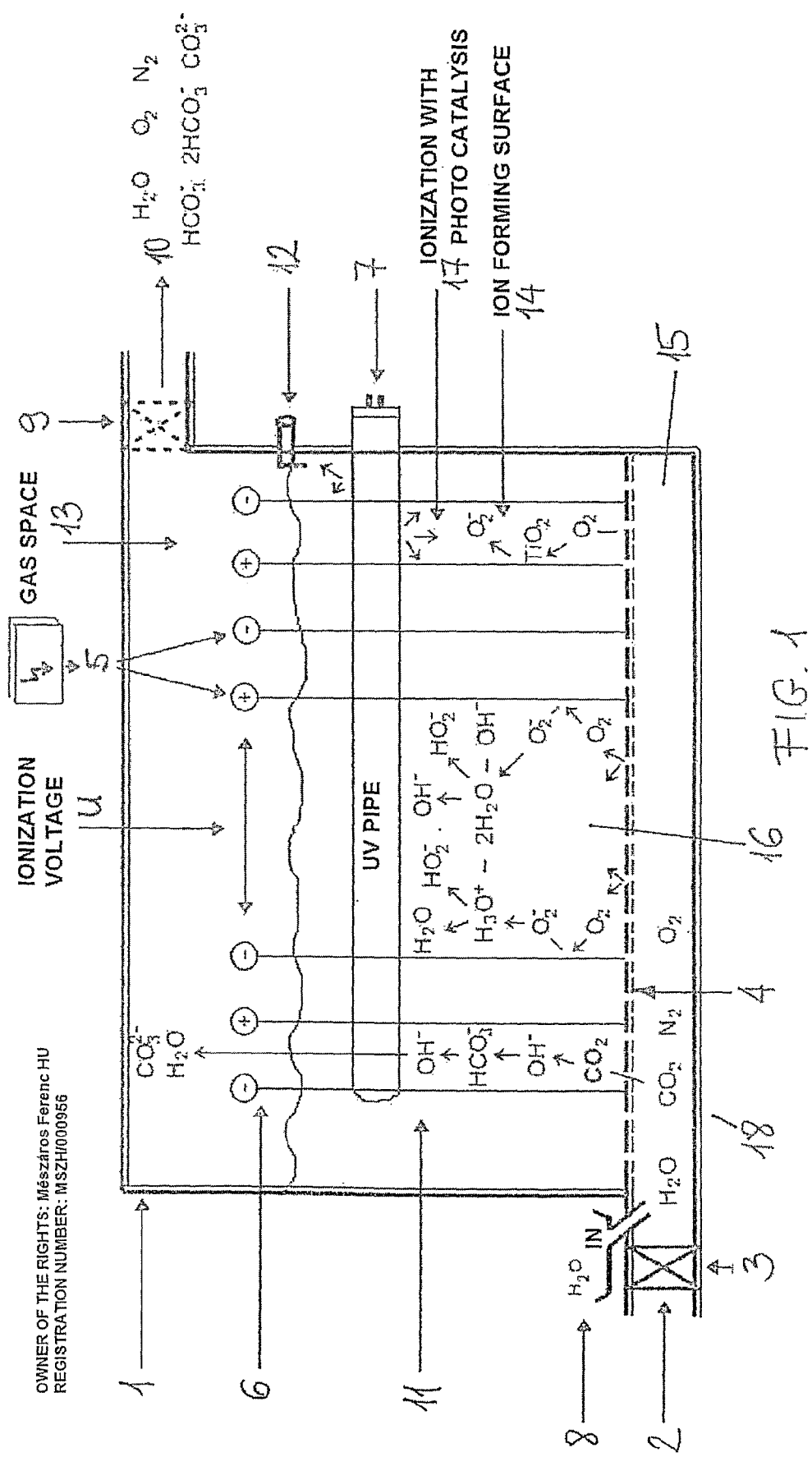

The FIG. 1 shows the parts of the closed system reaction vessel and their theoretical arrangement, in side-view.

The FIG. 1 shows the reaction vessel 1 with the flue gas inlet 2 on its bottom. The flue gas gets into the lower part of the reaction vessel 1, into the gas pulverizer 15 through the one-way valve 3. The intake of the water takes place through the water feeder 8 into the lower part of the reaction vessel 1 as well. The flue gas then goes upwards and through the perforations of the surface of the pulverizer surface 4 of the gas pulverizer 15 gets to the ionization space 16. In the ionization space 16 the reaction medium 11 can be found, which is the polarized, ionized water produced by the U ionization voltage created by the direct current supply unit 5, and the level of this water goes up to the overflow 12 on the side wall of the reaction vessel 1. The electrodes 6—made of titanium or coated with titanium dioxide and provided with an ion forming surface 14 collecting the proper ions from their surroundings and on the surface of which the ionization with photocatalysis 17 takes place—are situated in the ionization space 16.

In the reaction medium 11 in the middle of the ionization space 16 in given case horizontally placed is the UV radiator 7. After the reactions taking place in the reaction medium 11 the gas components leave the reaction vessel 1 from the gas space 13 situated above the reaction medium 11 through the pressure regulating valve 9 and the gas outlet 10.

In case of functioning of the closed system reaction vessel 1 showed in the FIG. 1, the one-way valve 3 is a common check valve, it lets the flue gas go in a single way, which gets into the bottom of the reaction vessel 1, to the gas pulverizer 15. From there it goes up into the reaction medium 11 between the electrodes 6 through the pulverizer surface 4. The material of the electrodes 6 is titanium, or their surface is titanium dioxide, which is important, because it makes possible ionization with photocatalysis under the effect of light. During the ionization the UV radiator 7 generates the surface of the electrodes 6 and produces $O_2^-$ ion (peroxide ion) from neutral $O_2$ gas by adding an electron. In the meantime the voltage connected to the electrodes 6 polarizes and ionizes the water. $O_2^-$ ion (peroxide ion) reacts with $H_2O$ molecule and produces $OH^-$ (hydroxide) ion, and $HO_2^-$ (perhydroxil) ion.

$CO_2$ streaming in with the flue gas reacts with the negative ionized water (OH (hydroxide), and $HO_2^-$ (perhydroxil)) and produces $HCO_3^-$ and/or $2HCO_3^-$ ion.

The flue gas pulverized from the bottom bubbles through the reaction medium 11, and accumulates in the gas space 13 above the reaction medium 11 and leaves through the gas outlet 10. $N_2$, $O_2$ gases in the flue gas go through the system in an unchanged form, as they can not get into reaction under these conditions. $O_2$ however takes part in the process as a reaction partner, but its main role is the transmitting, forwarding the electron ($e^-$). $O_2$ coming into the system as a gas leaves the system at the end of the process almost in an unchanged formation as a gas. A small part of the $O_2$ come into the system as a gas infiltrates into the process, into the reaction medium 11. After a multiple reaction circle the $O_2$ infiltrated this way changes back to neutral $O_2$ gas and leaves the equipment through the gas space 13.

A temporary new supply of water or vapor is necessary for the process, because water plays the role of the reduction partner of $CO_2$. So proportionately with the quantity of $CO_2$ to be bound, water ($H_2O$) should be fed to the process as well, which leaves through the overflow 12 either as a liquid, containing $HCO_3^-$ and/or $2HCO_3^-$ ions, or as vapor through the gas outlet 10.

In case the reaction medium 11 can be saturated with $OH^-$ ion to such an extent, that $HCO3^-$ (hydrogencarbonate) is capable for further reactions, then it can take up another electron ($e^-$). Then $CO_3(^{2-})$ (carbonate ion) ionized gas and water ($H_2O$) are produced. $CO_3(^{2-})$ (carbonate ion) can leave the gas space 13 as a gas and getting to the outer area it gets into reaction with hydrogen with electron defect from the vapor of the air, then it loses its charge and changes back to $HCO_3^-$ (hydrogencarbonate) and water.

The flue gas of internal combustion engines contains a considerable amount of water as combustion product. Combustion of hydrocarbons produces as much water ($H_2O$), as carbon dioxide $CO_2$ of order depending on how perfect the burning is. It means that there is a certain quantity of water in the flue gas to bind $CO_2$, but it is not always sufficient to bind the full quantity of $CO_2$. In order to increase efficiency additional quantities of water should be fed. This water is available in unlimited quantity in the case of vehicles travelling on the seas, respectively on water. The vapor content of air, —which is also a greenhouse gas—is also available in unlimited quantities. The vapor in the air is available anywhere in proper quantity.

In the reaction cell 1 according to the invention simultaneous functioning of two different technical solutions is responsible for the efficient maintenance of the ion producing process. Besides producing hydroxide ion ($OH^-$), as the continuation of the reaction, the reduction of $CO_2$ takes place as well in our reaction vessel 1 in a water medium ionized negatively.

In the combined equipment as the completion of the (OH) hydroxide ion enrichment produced under the effect of direct voltage, introduced earlier, the process just introduced is also applied in the equipment in such a way, that the surfaces of the electrodes 6 are provided with $TiO_2$ coating. Under the effect of this, the same electrodes 6 can attend two tasks at the same time. So under the effect of electromagnetic radiation, in given case UV radiation—preferably between 190-320 nm wave length—the surface of the electrode is induced (reaction No. 1), respectively direct current is connected to the same electrodes resulting in the polarization and dissociation of the water molecule to its ions between the anode and cathode. $2H_2O = H_3O^+ + (OH^-)$ (reaction No. 2).

The two processes result in more efficient ionization, (alkalinity) as they support each other, as the production of ($OH^-$) hydroxide ion is more intense.

Figure 2:
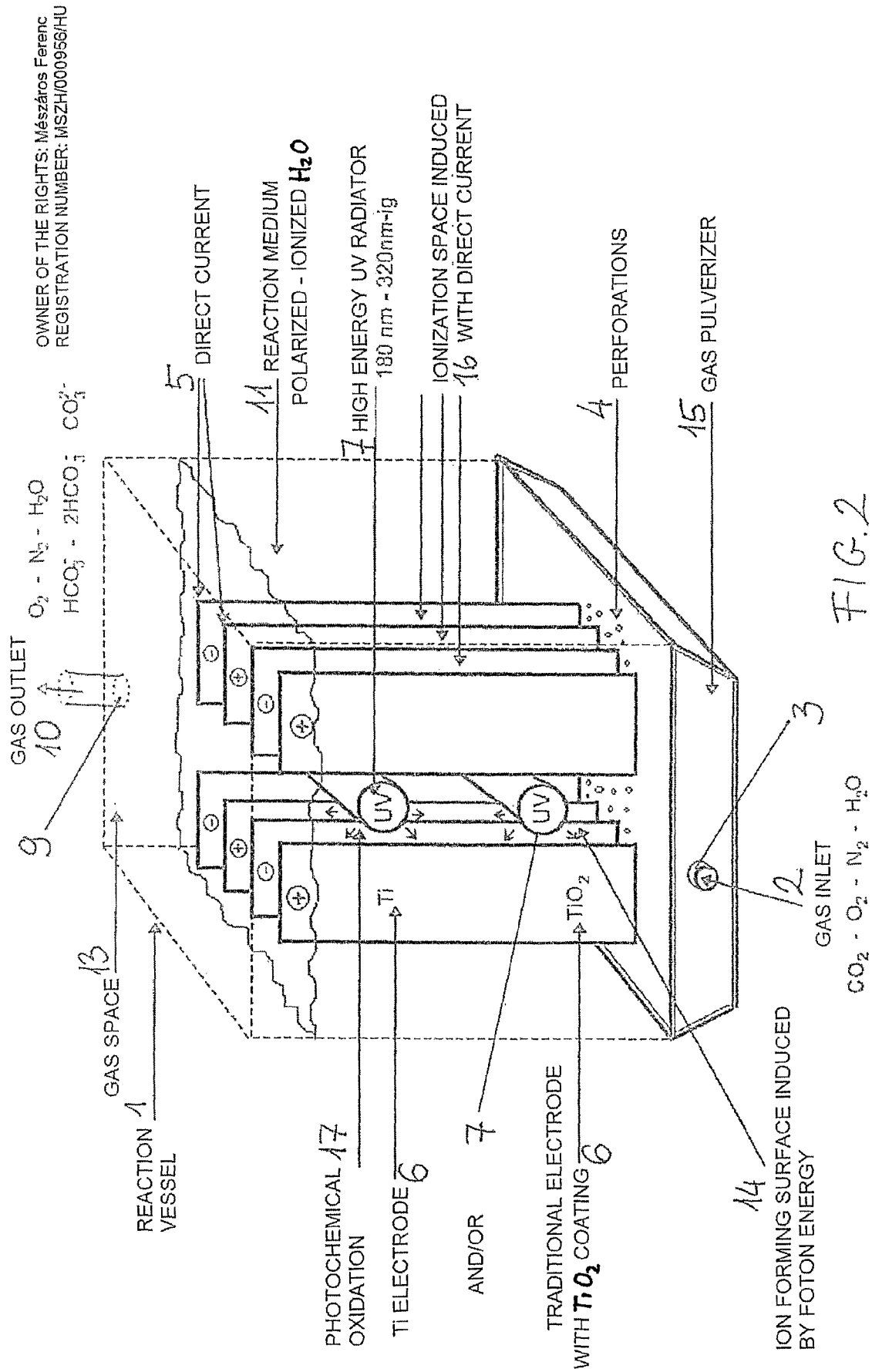

The FIG. 2 shows a spatial front view of a possible definite interior realization of the closed system reaction vessel 1 shown in the FIG. 1 in side-view.

The reaction vessel 1 is shown in the Figure without the outer cover. The electrodes 6 can be seen in the Figure, in two rows, in standing position parallel with each other. Two oblong UV radiators are placed between them in horizontal position. In the bottom of the reaction vessel 1 the gas pulverizer 15 is placed, provided on the upper part with the pulverizer surface 4 with fine perforations.

In the definite formation shown in the FIG. 2 the functioning of the reaction vessel 1 is the same as the function of the theoretical arrangement shown in the FIG. 1.

The FIG. 3 shows the application of the closed system reaction vessel on ships.

The FIG. 3 shows the gas processing cell 18 placed on a ship 23 floating on the surface of outer mass of water 24, in given case a lake, river or sea. The gas-processing cell 18 has the arrangement of the closed system reaction vessel 1 with a structure introduced in details in the FIGS. 1 and 2. Here the reaction vessel 1 has a gas outlet 10 and an overflow 12. Resulting from the pump 21 function, the seawater gets to the vertical tube of the gas-processing cell 18 protruding to the chimney 25 of the ship 23 through the water soaking in 22. The outer air also gets to the vertical tube of the gas processing cell 18 protruding to the chimney 25 of the ship 23. The flue gas outlet 20 takes place from the chimney 25 of the ship 23 through the gas processing cell 18 and gas outlet 10.

It can be seen in the FIG. 3, that the gas processing cell 18 situated on board of the ship 23, can take up unlimited quantity of water for its function from the outer mass of water 24, in given case from a lake, river, or sea. The water leaving through the overflow 12 leaves also in given case into the outer mass of water 24. The other gases leave into the outer atmosphere as shown in the FIG. 1.

Besides using on ships closed system reaction vessel base arrangement as shown in the FIG. 3 can be used in a similar way on other mobile vehicles, lorries, buses, cars. This case the application should be completed so, that in order to increase the quantity of ($OH^-$) hydroxide ion additional quantity of water should be fed into our closed system, e.g. with the help of a pump, and/or through a socalled Venturi valve, with sucking of the outside air the vapor of the air is condensed in the equipment.

The FIG. 4 shows the theoretical basic arrangement of the self-supporting open system.

The carbon dioxide harrow 33 of cylinder or spherical shape rotating on the upper part of the outer mass of water 24 can be seen in the FIG. 4. The material of the harrow 33 is titanium, or such an object, the outer surface of which is titanium dioxide. On the outer titanium dioxide surface 26 of the carbon dioxide harrow 33 a water film 27 is produced continuously due to the rotation of the carbon dioxide harrow 33. The active surface of the carbon dioxide harrow 33 can be considerably increased in given case by forming a porous surface.

The self-supporting open system shown in the FIG. 4 functions as follows.

The process of photo-oxidation:

There is a cylinder or sphere of suitable material or coated with titanium or titanium dixode of proper surface treating. This coating is the electron transmitter, its photo-catalyst effect is made use of.

During the process the $TiO_2$ surface is induced by electromagnetic radiation in the present case by outside light, resulting in the production of a socalled electron hole-pair having the characteristic, that it easily passes its charge. In our case $O_2$ gas is the partner taking up the charge, so an ion with an additional electron is created ($O_2^-$). The phenomenon is the so-called photocatalysis oxidation (ionization). In a water medium as the continuation of the reaction $O_2^-$ molecule with electric charge passes its charge to a hydrogen with electron defect of a water molecule ($H^+$) proton and two separate ions of different charge are produced from the polarized $H_2O$.

$$H_2O+O_2^-=HO_2^-+(OH^-)$$

The rotation of the sphere or cylinder creates a water film on the surface continuously, so the reaction takes place in the water film. In case there is a water film, then the reaction takes place in it. The cylinder continuously binds $CO_2$ with its rotation, which is afterwards dissolved in the water. For maintaining the process the presence of oxygen of the atmosphere is needed, which is the reaction partner for keeping up the process.

The first part of the process:

$TiO_2$+light energy+atmospheric $O_2$, +water=water enriched with ionized ($OH^-$) ion (as a film layer)+$HO_2^-$ (perhydroxyl ion)

Then the second part takes place according to the method of the invention in a self-supporting way, $CO_2$ diffuses into the water film layer enriched with ($OH^-$) ion, that is water enriched with ($OH^-$) ion+$CO_2$=water containing $HCO_3^-$ dissolving in the surrounding water resulting from the continuous rotation or movement of the spheres, respectively cylinders.

It can happen resulting from wave movements or in rivers due to the continuous flow of the water.

The FIG. 5 shows a possible way of located application of the self-supporting open system shown in the FIG. 4.

The carbon dioxide harrows 33 joining the island fastening 37 connected with the connecting system 36 to each other, rotating on the upper part of the outer mass of water 24 can be seen in the FIG. 5. Furthermore the current generator 34 with the fixed UV reflectors 35 fixed on it, the generator base with $TiO_2$ surface 38, as well as the island fastening 37 can be seen in the figure. The carbon dioxide harrows 33 are in constant movement resulting from the movement, fluctuation of the water forming a water film 27 on the outer titanium dioxide surface 26. The water film 27 forming on the outer $TiO_2$ surface 26 of the carbon dioxide harrows 33 are induced in daytime by daylight light energy 31, and night time by nightlight energy 32. Resulting from this the photocatalyst reaction takes place on the outer surface of the carbon dioxide harrows 33, and the $CO_2$ content of the atmosphere is continuously dissolved in the water by the carbon dioxide harrows 33 this way realizing the method according to the invention. The daylight functioning is ensured by the sunshine, the nighttime current generator 34 working with wind-power and UV reflectors 35 ensures functioning. These light the outer surface of the carbon dioxide harrows 33 with a light in the UV range, 190-310 nm wavelength.

The FIG. 6 shows the theoretical figure of a possible way of mobile application of the self-supporting open system.

The FIG. 6 shows, that the carbon dioxide harrows 33 connected with the connecting system 36 to each other are joined the ship 23 floating on the outer mass of water 24 by the connecting system 36, and the ship 23 tows them on the surface of the water. Resulting from the towing the carbon dioxide harrows 33 rotate, and a water film 27 is formed continuously on their surface. The surface of the carbon dioxide harrows 33 is activated by the daylight light energy 31 and during the towing dissolving of $CO_2$ from the atmosphere into the water continuously takes place.

In case of a mobile self-supporting open system shown in the FIG. 6 the functioning principle shown in the FIG. 4 is realized, with the difference, that the spheres respectively cylinders are kept in constant movement, this way the water film covering their surface is continuously changing, so photo-oxidation, forming of ions (OW) and $CO_2$ reduction becomes constant. The stabilized $CO_2$ gas is dissolved for example into the sea water in the form of hydrogen-carbonate and/or bicarbonate.

In case of a definite realization:

The diameter of the spheres bearing the catalyst surface is 1-2 m.

Their surface is apparently only a few square meters.

In practice due to the porous formation of the surface, that can be executed by traditional methods, the surface of one sphere can equal to several hundreds (thousands?) of square meter, (See—1 g surface of active carbon can be several hundreds of square meter, respectively nanotechnology.)

Consequently the active surface of a few dozens of rotating spheres (attracting $CO_2$ molecule to themselves) and is responsible for the socalled hit probability—can be measured in square kilometers.

The FIG. 7 shows the theoretical figure of the joint application of the self-supporting and closed system in a fixed, installed way.

The FIG. 7 shows the sea natural gas extracting drilling rig 41 realized as a reduction island 47 in the outer mass of water 24 with natural gas extraction pipe 42 protruding into the sea. The gas separator 43 provided with fixed UV reflectors 35 is situated on the part above the water of the sea natural gas extracting drilling rig 41 above the water. Delivery of clean natural gas 44 and outlet of separated $CO_2$ 45 take place below the seawater surface. The ion forming cell island 40 is fixed to one of the sides of the sea natural gas extracting drilling rig 41 and below this in the surroundings of the carbon dioxide harrows 33 connected with a connecting system 36 to each other takes place the pulverization of $CO_2$ 46. The carbon dioxide harrows 33 connected with a connecting system 36 to each other join the other side of the sea natural gas extracting drilling rig 41 furthermore, and they are activated by daylight light energy 31 and in the surroundings of which as well takes place the pulverization of $CO_2$ 46.

The fixed equipment according to the FIG. 7 is installed to/on water surface e.g. sea, river or cooling water storing ponds of power stations in such a way, that the closed cell system mentioned before and the self-supporting system are installed together on the "water surface", then the flue-gases and/or the $CO_2$ content of the atmospheric air is bound by applying the already introduced reaction chain, which is suitable for binding significant amounts of carbon dioxide gas produced during natural gas extraction.

The FIG. 8 shows a possible realization of the self-supporting, mobile system with the application of a ship-hulk surface-treated with $TiO_2$. Atmospheric oxygen 28, atmospheric $CO_2$ 29, and the ship 23 coated with $TiO_2$ floating on the surface of the outer mass of water 24 can be seen in the FIG. 8. The pump 21 and the water spray 48 are situated on the ship 23. The water film 27 formed on the $TiO_2$ surface 26 is exposed to daylight light energy 31 during daytime. In this case the photocatalyst reaction takes place on the outer surface of the ship 23 coated with $TiO_2$ surface 26.

In case of the self-supporting, mobile system applying a surface treated ship-hulk shown in the FIG. 8, the upper part or the full surface of the ship-hulk is coated with ($TiO_2$) and water e.g. pumped from the sea is run or sprayed on it, when a thin water layer is formed. In the thin water layer photocatalyst ion forming ($OH^-$) takes place continuously under the effect of sunshine. As a continuation of the reaction atmospheric $CO_2$ diffuses into the water layer enriched with hydroxide ions. Carbon dioxide is reduced in the already described way, and as next step, it dissolves in its natural form ($HCO_3^-$) into the sea.

The FIG. 9 shows a theoretical figure of the application of the combined, closed system, that can be installed in a mobile device, in case of joint application of both systems.

In the FIG. 9 reaction vessel 1 can be seen with the flue gas ingoing opening 2 through the one-way valve 3, the pulverizer surface 4, the ion valves 49, the gas outlet 10 through the one-way valve 9 and the overflow 12. The ionization regenerating system 50 whose elements are the high voltage supply unit 51, the circulating pump 52, the ionizator 53, the air pump 54, the acid water regenerator 55, the $TiO_2$ catalyst 56, the photo-catalyzation UV radiator 57, the air vent 58, the circulation 59, the platinum membrane 60, the ionized water feedback 61, as well as the ionized water inlet 62 can be seen in the Figure.

In case of a arrangement shown in the FIG. 9 applying the combined closed system, the two methods, photo-oxidation and direct current ionization are used together. With this method the system is applied in a mobile, moving device (some vehicle). The binding of carbon dioxide is realized in the closed cell using pulverization. The water rich in ions ($OH^-$+$H_2O$) is circulated in the closed reduction cell with the help of a circulating pump, which circulates only the hydroxide water with negative charge through the ionizing equipment. The water with electron defect ($H_3O^+$) leaving on the other side of the ionizator is fed back to the ionizator through a socalled photo-oxidizing regenerating unit, which neutralizes the acid water, even makes it slightly alkaline with $O_2$ blowing air into it. Continuous alkaline water supply charged with hydroxide ($OH^-$) ion is resulting from the circular process.—No waste that is no acid water ($H_3O^+$) is produced!

Application Fields:

The method according to the invention can be practically used everywhere, where there is production of "$CO_2$", as a socalled restructured "water molecule" is used, which is a natural material, and after the gas reduction is also a natural product is formed. It is not harmful for the environment, there are no by-products. The carbonate and bicarbonate produced are the components of natural mineral waters, consumed by the whole mankind daily.

Consequently the ionized "$CO_2$" reduced by hydroxide ($OH^-$) water can be released to the environment, because it is an environmentally friendly compound. Resulting from this the method is compatible to every technology where the end product (gas flue) contains carbon dioxide.

Advantages:

The method according to the invention can be used anywhere, where water is available. Rivers, seas, oceans, rainwater, groundwater, "tapwater" (or vapor, being produced together with every combustion products—wastewater).

For the ionization of water, for producing hydroxide ion ($OH^-$), electric current, solar cell, radiant energies, radiofrequency radiation is needed, that can be used at the place of application.

A possible application of the method is, when using ionization cells in a socalled reaction vessel water molecules are polarized under the effect of direct voltage and carbon dioxide reduction is realized with hydroxide ($OH^-$) ions produced during autoprotolysis of water under the effect of ionization.

With reduction of the quantity of "$CO_2$" gas the solution according to the invention contributes to the protection of the environment and the climate, to ease air-pollution and global warming. The technology can be used in motoring industry, in energy industry, in transportation, shipping and in several other areas of industry where carbon dioxide emission is significant.

The method according to the invention is particularly suitable for decreasing the $CO_2$ content of atmospheric gases.

REFERENCES

1—reaction vessel
2—flue gas inlet
3—one-way valve
4—pulverizer surface-perforations
5—direct current supply unit
6—electrode (with titanium or titanium dioxide coating)
7—UV radiator
8—water feeder
9—pressure regulating valve
10—gas outlet
11—reaction medium—polarized, ionized water
12—overflow
13—gas space
14—ion forming surface—induced by foton energy
15—gas pulverizer
16—ionization space
17—ionization with photocatalysis 18—gas-processing cell (containing reaction vessels 1)
19—air inlet
20—flue gas outlet (chimney, exhaust)
21—pump
22—water soaking in
23—ship
24—outer mass of water (sea, river, lake)
25—chimney
26—titanium dioxide surface
27—water film
28—atmospheric oxygen (FIG. 8)
29—atmospheric $CO_2$ (FIG. 8)
30—sea floor
31—daylight light energy (by daylight)
32—night-light energy (by night-light)
33—carbon dioxide harrow (cylinder or sphere)
34—current generator
35—UV reflectors
36—connecting system
37—island fastening
38—generator base ($TiO_2$ surface)
39—scaffolding
40—ion forming cell island
41—sea natural gas extracting drilling rig
42—natural gas extraction pipe
43—gas separator
44—delivery of clean natural gas
45—outlet of separated $CO_2$
46—pulverization of $CO_2$
47—reduction island
48—water spray
49—ion valve
50—ionizing regenerating system
51—high voltage supply unit
52—circulating pump
53—ionizator
54—air pump
55—acid water regenerator
56—$TiO_2$ catalyst
57—photo-catalyzation UV radiator
58—air vent
59—circulation
60—platinum membrane
61—ionized water feedback
62—ionized water inlet
U—ionization voltage

The invention claimed is:

1. A method for reducing $CO_2$ content of flue or atmospheric gases,
comprising
reacting carbon dioxide ($CO_2$) with alkaline ionized water, wherein the reaction medium for binding carbon dioxide ($CO_2$) gas is hydroxide ionized water containing ($OH^-$) ions of alkaline characteristics, wherein during the reaction from the carbon dioxide ($CO_2$) gas and water, carbonate ion ($CO_3^{2-}$) and hydrogencarbonate/bicarbonate ($2HCO_3^-$) are formed, which leave for the outside atmosphere and/or outside water with the bound $CO_2$ content in stable gas or liquid form,
wherein
I) hydroxide ($OH^-$) ions are produced in an ionization cell and in the ionization cell direct voltage is applied for the production of ($OH^-$), wherein the ionization cell contains titanium electrodes (6), or the surface of the electrodes is titanium, or has a titanium dioxide coating, that makes possible ionization with photocatalysis under the effect of light, during which the surface of the electrodes (6) is induced with a UV radiator (7), so by adding an electron to neutral $O_2$ gas, $O_2^-$ ion (peroxide ion) is produced, meanwhile the voltage on the electrodes (6) polarizes and ionizes the water, and $O_2^-$ ion (peroxide ion) gets into reaction with $H_2O$ molecule and produces $OH^-$ (hydroxide) ion and $HO_2^-$ (perhydroxil) ion, then $CO_2$ to be bound gets into reaction with the negatively ionized water ($OH^-$ (hydroxide) and $HO_2^-$ (perhydroxil)) and produces $HCO_3^-$ ion; or II) the titania-based photocatalyst is a titanium or titanium dioxide coated cylinder or sphere, where the coating is the electron transmitter, wherein the $TiO_2$ surface is induced by electromagnetic radiation, optionally by outside natural or artificial light, when an electron-hole pair is created, having the characteristics of being capable of passing its charge, wherein the partner taking up the charge is $O_2$ gas, and wherein an ion $O_2^-$ charged with an electron is arisen, and wherein oxidation with photocatalysis (ionization) takes place, and wherein as the continuation of the reaction in the water medium the $O_2$ molecule with electric charge passes its charge to a hydrogen, proton ($H^+$)—an electron defect hydrogen of the water molecule—, and polarized $H_2O$ is divided into two separate ions of charge, $H_2O+O_2^-=HO_2^-+(OH^-)$, and with the rotation of the sphere or cylinder continuously a water film is produced on its surface, and the reaction takes place in the water film, so the cylinder continuously binds $CO_2$ with its rotation, which is afterwards dissolved into the water; or III) the method is performed in a closed system wherein photo-oxidation and direct current ionization are applied together in such a way, that binding of carbon dioxide takes place in a closed cell, by pulverization, and ion rich water ($OH^-+H_2O$) is circulated in the closed reduction cell with a circulating pump, which pump circulates only the negative charged hydroxide water through ionization equipment, the electron defect water ($H_3O^+$) leaving at the other side of an ionizator is fed back to the ionizator in such a way, that leading through a photo-oxidation regenerating unit where the $O_2$ in an air blow neutralizes the acid water, even makes it slightly alkaline, and the result of the method is a circular process resulting in continuously alkaline, hydroxide ($OH^-$) ion charged water and no acid water ($H_3O^-$), wherein no waste is produced.

2. A method according to claim 1, wherein hydroxide ($OH^-$) ions are produced in an ionization cell and in the ionization cell direct voltage is applied for the production of ($OH^-$).

3. A method according to claim 2, wherein the ionization cell contains titanium electrodes (6), or the surface of the electrodes is titanium, or has a titanium dioxide coating, that makes possible ionization with photocatalysis under the effect of light, during which the surface of the electrodes (6) is induced with a UV radiator (7), so by adding an electron to neutral $O_2$ gas, $O_2^-$ ion (peroxide ion) is produced, meanwhile the voltage on the electrodes (6) polarizes and ionizes the water, and $O_2^-$ ion (peroxide ion) gets into reaction with $H_2O$ molecule and produces $OH^-$ (hydroxide) ion and $HO_2^-$ (perhydroxil) ion, then $CO_2$ to be bound gets into reaction with the negatively ionized water ($OH^-$ (hydroxide) and $HO_2^-$ (perhydroxil)) and produces $HCO_3^-$ ion.

4. A method according to claim 1, wherein the titania-based photocatalyst is a titanium or titanium dioxide coated cylinder or sphere, where the coating is the electron transmitter, wherein the $TiO_2$ surface is induced by electromagnetic radiation, optionally by outside natural or artificial light, when an electron-hole pair is created, having the characteristics of being capable of passing its charge, wherein the partner taking up the charge is $O_2$ gas, and wherein—an ion $O_2^-$ charged with an electron is arisen, and wherein oxidation with photocatalysis (ionization) takes place, and wherein as the continuation of the reaction in the water medium the $O_2$ molecule with electric charge passes its charge to a hydrogen, proton ($H^+$)—an electron defect hydrogen of the water molecule—, and polarized $H_2O$ is divided into two separate ions of charge, $H_2O+O_2^- = HO_2^- + (OH^-)$, and with the rotation of the sphere or cylinder continuously a water film is produced on its surface, and the reaction takes place in the water film, so the cylinder continuously binds $CO_2$ with its rotation, which is afterwards dissolved into the water.

5. A method according to claim 1, which is performed in a closed and/or open system.

6. A method according to claim 5, which is performed in a closed system, wherein photo-oxidation and direct current ionization are applied together in such a way, that binding of carbon dioxide takes place in a closed cell, by pulverization, and ion rich water ($OH^- + H_2O$) is circulated in the closed reduction cell with a circulating pump, which pump circulates only the negative charged hydroxide water through ionization equipment, the electron defect water ($H_3O^+$) leaving at the other side of an ionizator is fed back to the ionizator in such a way, that leading through a photo-oxidation regenerating unit where the $O_2$ in an air blow neutralizes the acid water, even makes it slightly alkaline, and the result of the method is a circular process resulting in continuously alkaline, hydroxide ($OH^-$) ion charged water and no acid water ($H_3O^+$), wherein no waste is produced.

7. A method according to claim 1, which is performed at an industrial unit, power station or furnace having $CO_2$ emission.

8. A method according to claim 1, which is performed at a land vehicle or, power machine in a mobile.

9. A method according to claim 1, which is performed at a water vehicles or ship.

10. A method according to claim 1, which is performed at an aircraft, airplane or helicopter.

11. An equipment for reducing $CO_2$ content of flue or atmospheric gases, comprising a closed system reaction vessel (1), which has a flue gas inlet (2) at the lower part of the reaction vessel (1), wherein the flue gas is capable of getting to the lower part of the reaction vessel (1) to a gas pulverizer (15) through a one-way valve (3), wherein water is capable of being fed through a water feeder (8) also to the lower part of the reaction vessel (1), from where the flue gas is capable of going upward and capable of getting to an ionization space (16) through perforations (4) of a pulverizer surface (4) of the gas pulverizer (15), said ionization space (16) is capable of containing a reaction medium (11), which is polarized, ionized water capable of being produced by an ionization voltage (U) capable of being created by a direct current supply unit (5), wherein the level of the said water is capable of being up to an overflow (12) on sidewall of the reaction vessel (1), and in the ionization space (16) there are the electrodes (6) made of titanium, or coated with titanium dioxide, having ion forming surface (14) capable of collecting ions in their surroundings and ionization with photocatalysis (17) is capable of taking place on their surface, and optionally a horizontal UV radiator (7) is placed in the reaction medium (11) when present in the middle of the ionization space (16), and wherein gas components are capable of leaving the reaction vessel (1) from a gas space (13) situated above the reaction medium (11) when present through a pressure regulating valve (9) and gas outlet (10).

12. An equipment according to claim 11, wherein the electrodes (6) are situated in two rows, in standing position, parallel with each other and between them, in horizontal position there are two oblong UV radiators (7), furthermore in the bottom of the reaction vessel (1) there is a gas pulverizer (15) unit, which is provided at the upper part with a pulverizer surface with fine perforations (4).

13. An equipment according to claim 11, which is on a ship, wherein an outer mass of water (24), which is optionally a lake, river, or sea, on the surface of which the ship (23) floats and a gas processing cell (18) having a closed system reaction vessel (1) arrangement is situated on board the ship (23), and the reaction vessel (1) has a gas outlet (10) and an overflow (12), and where water from the outer mass of water is capable of getting through a water soaking inlet (22) under the effect of a pump (21) to a vertical pipe of the gas processing cell (18) protruding into a chimney (25) of the ship (23), the outside air also capable of getting to the vertical pipe of the gas processing cell (18) protruding into the chimney (25) of the ship (23) through an air inlet (19), and a gas flue is capable of leaving through an outgoing flue opening (20) through the gas processing cell (18) and gas outlet (10).

14. An equipment for the reduction of $CO_2$ content of flue or atmospheric gases, which is a self-supporting, open system, containing a carbon dioxide harrow (33) of cylinder or spherical shape capable of rotating and being formed on the upper part of an outer mass of water (24), the raw material of said carbon dioxide harrow (33) is titanium, or the outer surface of which is provided with a titanium dioxide coating, and an electron transmitter and photocatalysis effect of the titanium dioxide is capable of resulting from the rotation of the carbon dioxide harrow (33) on the outer, titanium dioxide surface (26) of the carbon dioxide harrow (33), wherein continuously a water film (27) is capable of being created, and the active surface of the carbon dioxide harrow (33) is optionally increased by a porous surface.

15. An equipment according to claim 14, wherein the carbon dioxide harrow (33) is connected with connecting system (36), which are on the upper part of the outer mass of water (24) fixed to an island fastening (37), furthermore a current generator (34) and UV reflectors (35) and the carbon dioxide harrow (33) are capable of being in constant movement resulting from the movement and fluctuation of water, a water film (27) is capable of being created on the outer titanium dioxide surface (26), during daytime daylight light energy (31) and at night night-light energy (32) is capable of inducing a water film (27) being capable of being created on the outer titanium dioxide surface (26), capable of resulting in photocatalyst reaction on the outer surface of carbon dioxide harrow (33), and the $CO_2$ content of the atmosphere is capable of continuously dissolving into the water, wherein by carbon dioxide harrows (33) the daytime function is capable of being ensured by the sunshine, whereas the night time function is capable of being ensured optionally by a current generator (34) capable of working with wind energy, as well as UV reflectors (35) capable of lighting the outer surface of the carbon dioxide harrow (33) with light of 190-310 nm UV range wavelength.

16. An equipment according to claims 14, wherein the carbon dioxide harrow (33), which is connected with connecting system (36), which are fixed by this connecting system (36) to a ship (23) floating on the surface of the outer mass of water (24), which are capable of being towed on the water surface by the ship (23), resulting in the rotation of the carbon dioxide harrows (33) and the creation of a continuous water film on their surface, the surface of the carbon dioxide harrows (33) is capable of being activated by the daylight light energy (31), and during the towing capable of dissolving of $CO_2$ from the atmosphere into the water continuously.

17. An equipment according to claim 14, wherein the diameter of a sphere carrying a catalyst surface is 1-2 m, said surface is optionally of porous formation, due to the porous formation of the surface, the spherical surface corresponds with an increased active surface.

18. An equipment according to claim 11, which is capable of being realized as a reduction island (47), which is optionally a sea natural gas extracting drilling rig (41) with a natural gas extraction pipe (42), where a gas separator (43) is situated above the water surface of the sea natural gas extracting drilling rig (41), on which UV reflectors (35) are fixed, and the delivery of clean natural gas (44) and channeling of separated $CO_2$ (45) are capable of taking place below sea surface, an ion forming cell island (40) is fixed to one of the sides of the sea natural gas extracting drilling rig (41) and below this in the surroundings of the carbon dioxide harrow (33) connected with a connecting system (36) the pulverization of $CO_2$ (46) is capable of taking place, the carbon dioxide harrow (33) connected with a connecting system (36) join the other side of the sea natural gas extracting drilling rig (41), and are activated by daylight light energy (31) and the pulverization of $CO_2$ (46) is capable of taking place in their surroundings as well.

19. An equipment according to claim 11, wherein a pump (21) and a water spray (48) are situated on board a ship (23), and the upper, or complete surface of the ship (23) is coated with $TiO_2$, and water, which is optionally pumped out of the sea, is capable of being run or sprayed on the surface, creating a water layer, in which resulting from the sunshine continuous ion creation ($OH^-$) by photocatalization is capable of taking place, and atmospheric $CO_2$ is capable of diffusing into the water layer enriched by hydroxide ions, and is capable of dissolving into the sea in its form of ($HCO_3^-$).

20. An equipment according to claim 11, wherein the reaction vessel (1) is provided with a flue gas inlet (2) through a one-way valve (3), a pulverizer surface (4), ion valves (49), gas outlet (10) through the pressure regulating valve (9) as well as overflow (12), and an ionization regenerating system (50) whose elements include a high voltage supply unit (51), a circulating pump (52), an ionizator (53), an air pump (54), an acid water regenerator (55), a $TiO_2$ catalyst (56), a photo catalyzation UV radiator (57), an air vent (58), a circulation (59), a platinum membrane (60), an ionized water feedback (61), as well as an ionized water inlet (62).

\* \* \* \* \*